April 19, 1938.   R. GUNN   2,114,298
APPARATUS FOR INDICATING SMALL ELECTROMOTIVE FORCES
Filed Nov. 19, 1935
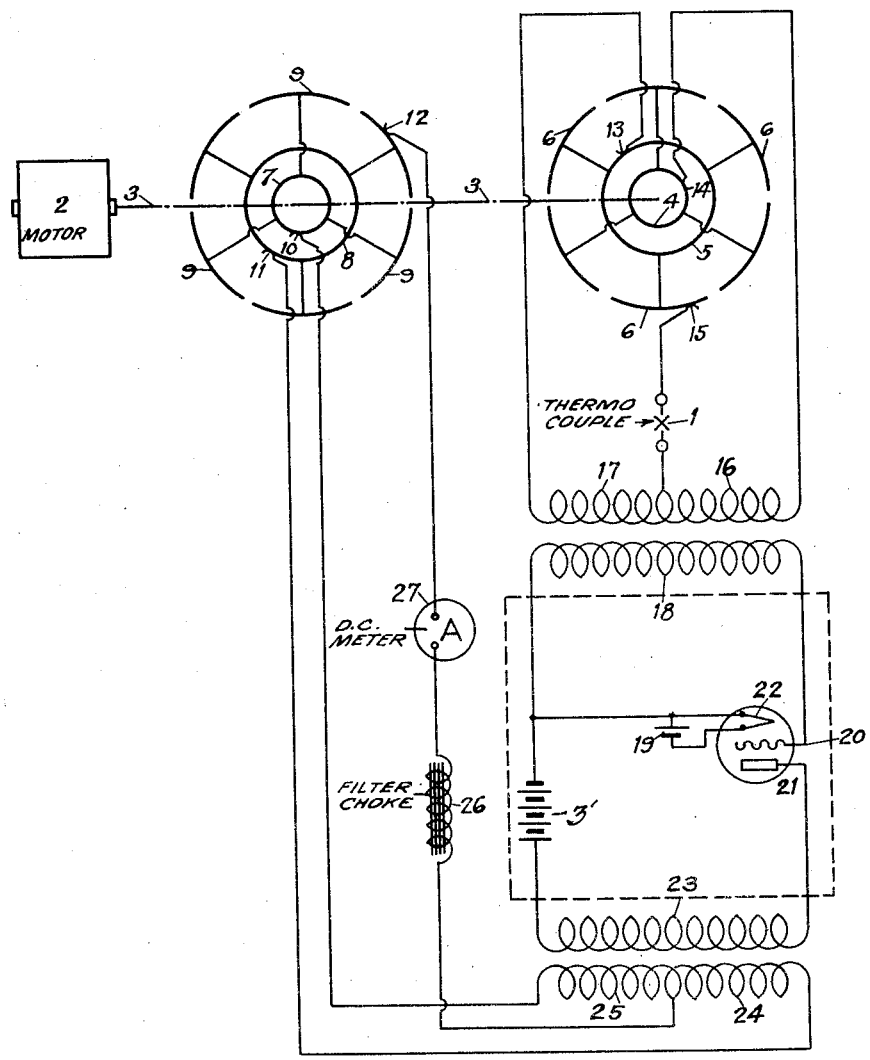
INVENTOR
Ross Gunn
BY
Robert A. Lavender
ATTORNEY Patented Apr. 19, 1938

2,114,298

UNITED STATES PATENT OFFICE 2,114,298

APPARATUS FOR INDICATING SMALL ELECTROMOTIVE FORCES

Ross Gunn, Washington, D. C.

Application November 19, 1935, Serial No. 50,616

2 Claims. (Cl. 171—95)

(Granted under the act of March 3, 1883, as amended April 30, 1928; 370 O. G. 757)

This invention relates to an apparatus for indicating small electromotive forces and, more particularly, to apparatus that may be satisfactorily employed aboard moving craft where small weight and size are desirable. The invention is particularly adapted to indicate a thermo-electromotive force generated by thermo-couples and, hence, to detect very small amounts of radiant energy in the near and far infra red band.

One of the objects of this invention is to provide an apparatus for indicating the value of an extremely small electromotive force.

Another object of this invention is to provide an apparatus of small weight and size for directly indicating the value of an extremely small electromotive force.

A further object of this invention is to provide a means for measuring small direct current potential differences while cancelling out or neutralizing the effect of incidental contact potential differences set up in the measuring circuits.

A still further object of the invention is to provide a means for setting up an alternating current that is a function of the direct current potential difference being measured, then amplifying the resultant alternating current, rectifying the amplified current, and indicating the value of the rectified current as a measure of the potential difference being measured.

Other and further objects of this invention reside in the circuit arrangements and apparatus employed therein as set forth more fully in the specification hereinafter following by reference to the accompanying drawing, wherein:

The single figure shows diagrammatically, by way of illustration but not of limitation, a circuit arrangement embodying the principles of this invention.

In the drawing, 1 is a source of steady electromotive force of very low value, such as might be obtained from a thermo-couple, which it is desired to measure. A driving motor 2 having a shaft 3 is arranged to drive two commutators 6 and 9 in strict synchronism. The commutators 6 and 9 are displaced from one another, or they may be shielded, to prevent marked inductive effects of one on the other. One terminal of the source of electromotive force 1 to be measured is connected to the midpoint of a well constructed split primary transformer, the two halves 16 and 17 of which are electrically symmetrical with respect to the midpoint, while the other terminal is connected to a brush or contactor 15 resting upon the commutator 6. The commutator 6 has an even number of commutator segments every other one of which is connected to a slip ring 4 while the remainder of the segments of commutator 6 are connected to a slip ring 5. A brush 13 resting upon slip ring 5 is connected to the end terminal of the half 17 of the split primary transformer, while a similar brush 14 resting upon slip ring 4 is connected to the end terminal of the half 16 of the split primary transformer. The terminals of the secondary 18 of the split primary transformer is connected to the control electrode 20 and cathode 22, respectively, of a thermionic tube amplifier and it constitutes an input circuit for said amplifier whereof the output circuit is energized by the battery 30. A primary winding 23 of an output transformer is connected in series with an appropriate source of anode potential between the cathode 22 and the anode 21 of the thermionic tube of the amplifier, forming an output circuit for said amplifier. The output transformer has a split secondary consisting of the halves 24 and 25. The midpoint of the secondary of said output transformer is connected by way of a filter impedance 26 and a direct current indicator 27 to the brush or contactor 12 resting upon the commutator 9, while the outside terminals of the secondary of said output transformer are connected to brushes 10 and 11, respectively. The brush 10 rests upon a slip ring 7, while the brush 11 rests upon a slip ring 8. The commutator 9 is similar to the commutator 6 and it has each alternate one of the segments thereof connected to the slip ring 7 while the other segments are connected to slip ring 8.

In operation, a thermo-couple or other source of electromotive force to be measured is connected at 1 between the midpoint of the primary 16—17 of the push-pull transformer and the brush 15. The motor 2 is running and turning commutators 6 and 9 synchronously. In a first position of the commutator 6, brush 15 engages with a commutator segment connected with slip ring 5, thus connecting the source of electromotive force 1 across the half 17 of the split primary of the push-pull transformer by way of slip ring 5 and brush 13. An instant later when the commutator 6 has rotated to bring the next segment thereof in contact with the brush 15, the connection of the source 1 with the half 17 of the transformer is broken and the source 1 is connected across the half 16 of the split primary by way of slip ring 4 and brush 14. As the commutator 6 continues its rotation, current flows from source 1 alternately through the halves 16 and 17 of the primary of the push-pull transformer and induces an alternating potential across the secondary winding 18 while maintaining, in effect, an unbroken primary circuit with a substantially constant impedance. The alternating potential across the winding 18 controls the flow of current in the output circuit of the amplifier in well known manner. The amplified output current pulses, flowing in the primary winding 23 of the output transformer, induce an alternating potential in the secondary winding 24—25. The commutator 9 alternately connects the indicator 27, in circuit with first one and then the other of the halves 24 and 25 of the secondary of the output transformer, synchronously with the growth and decay of the alternating potential thereacross in such a manner as to impress upon the indicator a rectified direct current potential. This potential causes a current to flow through the meter or indicator 27 and to indicate the value of the electromotive force applied at 1.

The meter 27 may be graduated to read in any desired units either in terms of the electromotive force applied at 1 or the value of the intensity of radiant energy falling upon a thermo-couple or photoelectric or photo-voltaic cell connected at 1. It should be obvious that the deflection of the meter 27 primarily depends upon the value of the electromotive force applied at 1 since the current flow in the primary of the push-pull transformer is a direct function of the electromotive force applied. However, in graduating the meter 27, the over-all amplification of the amplifier and transformers must be taken into account.

In constructing an indicating system in accordance with this invention, care should be taken to make the primary 16—17 of the push-pull input transformer electrically symmetrical. The brushes and slip rings should also be as near exact electrical duplicates as possible in order to present a constant input impedance to the sensitive vacuum tube amplifier.

This invention may be manufactured and used by or for the Government of the United States of America for governmental purposes without payment of royalties thereon or therefor.

I claim:

1. In a device for measuring small direct current potentials, in combination, a transformer having a center-tapped primary winding and a secondary winding, means connecting the center-tap of said primary winding to one terminal of a source of potential thereby maintaining, in effect, a continuously closed circuit through said primary and keeping the impedance of said primary constant, means for cyclically connecting the other terminal of said source of potential alternately to each of the outside terminals of said transformer primary, a thermionic tube amplifier having input and output circuits, means for connecting the secondary of said transformer in the input circuit of said thermionic amplifier, means for deriving an alternating current from said amplifier, means operating synchronously with said cyclic connecting means for rectifying the output alternating current energy from said amplifier, and a direct current measuring instrument connected to said rectifying means to measure the rectified output.

2. In combination, a transformer having a center-tapped primary and a secondary, an amplifier having an input circuit and an output circuit, means connecting the secondary of said transformer to control the input circuit of said amplifier, means connecting a midpoint of the primary of said transformer to one terminal of a source of direct current potential to be measured, thereby maintaining, in effect, a continuously closed circuit through said primary and keeping the impedance of said primary constant, rotary means for cyclically connecting the other terminal of said source of potential to be measured to first one and then the other of the outside terminals of the primary of said transformer, means for synchronously rectifying the output energy from said amplifier, said means comprising a mechanical rectifier driven from the same shaft as that used to cyclically connect said source of potential to be measured to first one and then the other of the terminals of the primary of said transformer, and a direct current measuring instrument connected to said rectifying means to measure the rectified output.

ROSS GUNN.